United States Patent
Yang et al.

(10) Patent No.: US 11,259,383 B2
(45) Date of Patent: Feb. 22, 2022

(54) LED DRIVING CIRCUIT COMPATIBLE WITH ELECTRONIC BALLAST AND ELECTRONIC SUPPLY, AND LED LAMP THEREOF

(71) Applicant: SHENZHEN TOPBAND CO., LTD., Guangdong (CN)

(72) Inventors: Qinghua Yang, Guangdong (CN); Yulong Wu, Guangdong (CN)

(73) Assignee: SHENZHEN TOPBAND CO., LTD., Shenzhen (CN)

( * ) Notice: Subject to any disclaimer, the term of this patent is extended or adjusted under 35 U.S.C. 154(b) by 247 days.

(21) Appl. No.: 16/606,771

(22) PCT Filed: Aug. 6, 2018

(86) PCT No.: PCT/CN2018/098942
§ 371 (c)(1),
(2) Date: Oct. 20, 2019

(87) PCT Pub. No.: WO2020/029006
PCT Pub. Date: Feb. 13, 2020

(65) Prior Publication Data
US 2021/0410249 A1    Dec. 30, 2021

(51) Int. Cl.
*H05B 45/375* (2020.01)
*H05B 45/50* (2020.01)

(52) U.S. Cl.
CPC .......... *H05B 45/375* (2020.01); *H05B 45/50* (2020.01)

(58) Field of Classification Search
CPC .................... H05B 45/375; H05B 45/50
See application file for complete search history.

(56) References Cited

U.S. PATENT DOCUMENTS

| | | | | |
|---|---|---|---|---|
| 2016/0316533 A1* | 10/2016 | Hsia | .......... | F21K 9/278 |
| 2017/0311397 A1* | 10/2017 | Hsia | .......... | H05B 45/50 |

\* cited by examiner

*Primary Examiner* — Daniel D Chang (57) ABSTRACT

This disclosure relates to a LED driving circuit compatible with an electronic ballast and an electronic supply, and a LED lamp, which include a first input terminal receiving an alternating current, a second input terminal, a buck circuit connected with the first input terminal and the second input terminal, a rectifier circuit connected with the buck circuit, a leakage current limit circuit connected with the rectifier circuit, a constant current output circuit connected with the leakage current limit circuit, a signal sample circuit connected with the second input terminal and the leakage current limit circuit, and a switch connected with the leakage current limit circuit. When a high frequency voltage outputted by the connected electronic ballast is automatically depressed for protecting subsequent circuits, when connecting the electronic supply, it is satisfied with a single terminal and double terminals connecting a power, and the double terminals pass a leakage current test.

18 Claims, 3 Drawing Sheets

FIG. 3

LED DRIVING CIRCUIT COMPATIBLE WITH ELECTRONIC BALLAST AND ELECTRONIC SUPPLY, AND LED LAMP THEREOF

FIELD

The present disclosure relates to LED driving circuits compatible with an electronic ballast and an electronic supply, and LED lamps thereof.

BACKGROUND

In recently years, under a background and environment of energy-saving and emission reduction to be strongly advocated, a management and a control of energy conservation and consumption reduction have been continuously increased, more and more attention degree has given to the environmental protection, people's environmental awareness are constantly improved. LED light source is a new generation of semiconductor light source. The LED light source has a characteristics in high efficiency and long life by comparing with the current light source. LEDs belong to green environment protection light source, and do not include harmful substances, such as mercury and lead. The lighting products using the LED as the light source are rapidly developed for replacing traditional lighting.

At present, LED lamps on the market are basically divided into the following types:

(1) light tube satisfied with a type A model (the electronic ballast)

(2) light tube satisfied with a type B model (electronic supply), but using one single terminal connecting the power, and the light tube with double terminals connecting the power can not pass a leakage current test.

(3) light tube satisfied with the type A model and the type B model, but when used as the type B model, one single terminal is connected with the power, double terminals connecting the power can not pass the leakage current test of the UL certification standard.

SUMMARY OF THE INVENTION

A technical problem to solve is to provide a LED driving circuit compatible with the electronic ballast and the electronic supply, and a LED lamp, according to the recited above of the related art.

A technical solution of the present disclosure for solving the technical problem is constructed a LED driving circuit compatible with an electronic ballast and an electronic supply, which including:

a first input terminal receiving an alternating current, a second input terminal, a buck circuit connected with the first input terminal and the second input terminal, a rectifier circuit connected with the buck circuit, a leak current limit circuit connected with the rectifier circuit, a constant current output circuit connected with the leakage current limit circuit, a signal sample circuit respectively connected with the second input terminal and the leakage current limit circuit, and a switch connected with the leak current limit circuit;

when the alternating current is a high frequency alternating current outputted by the electronic ballast, the buck circuit depresses the high frequency alternating current and outputs a buck signal; the rectifier circuit converts the buck signal or a low frequency alternating current into a direct current; the signal sample circuit detects the alternating current of the second input terminal, and bypasses the leakage current limit circuit when the alternating current of the second input terminal is the high frequency alternating current;

when the alternating current is a low frequency alternating current, the leakage current limit circuit detects a loop voltage of the LED driving circuit, and controls the switch to be turned off when the loop voltage of the LED driving circuit reaches a threshold value, and the constant current output circuit disconnects with the rectifier circuit.

Preferably, the first terminal includes a first pin and a second pin;

the LED driving circuit compatible with the electronic ballast and the electronic supply includes a first over-current protect circuit being connected between the first pin and the buck circuit in series, a third over-current being connected between the second pin and the buck circuit in series, and a second over-current protect circuit being connected between the second input terminal and the buck circuit in series.

Preferably, the buck circuit includes a first capacitor and a second capacitor;

a first terminal of the first capacitor is connected with the first over-current protect circuit; a second terminal of the first capacitor and a first terminal of the second capacitor are connected with the second over-current protect circuit; and a second terminal of the second capacitor is connected with the third over-current protect circuit.

Preferably, the leakage current limit circuit includes a limit circuit and a control circuit;

an input terminal of the limit circuit is connected with an output terminal of the rectifier circuit; an output terminal of the limit circuit is connected with a power supply terminal of the control circuit.

Preferably, the limit circuit includes a diode D3, a resistor R5, a resistor R6, and a resistor R9;

an anode of the diode D3 is connected with the output terminal of the rectifier circuit, a cathode of the diode D3 is connected with a first terminal of the resistor R5, a second terminal of the resistor R5 is connected with a first terminal of the resistor R6, a second terminal of the resistor R6 is connected with a first terminal of the resistor R9, and a second terminal of the resistor R9 is connected with the power supply terminal of the control circuit.

Preferably, the control circuit includes a control chip U1, a capacitor C5, a capacitor C7, a resistor R7, a resistor R8, and a capacitor C6;

the switch includes a MOS transistor Q; the MOS transistor Q is embedded in the control chip U1;

the control chip U1 includes a power supply circuit, a logic control circuit, and a driving circuit; an input terminal of the power supply circuit is connected with a eighth pin of the control chip U1, and an output terminal of the power supply circuit is connected with the logic control circuit; the logic control circuit is connected with an input terminal of the driving circuit, and an output terminal of the driving circuit is connected with a gate electrode of the MOS transistor Q; a drain electrode of the MOS transistor Q is connected with a third pin and a fourth pin of the control chip U1; a source electrode of the MOS transistor Q and the logic control circuit are connected with a fifth pin of the control chip U1;

the eighth pin of the control chip U1 as the power supply terminal of the control circuit is connected with the second terminal of the resistor R9; the eighth pin of the control chip U1 is further connected with the first power ground through the capacitor C5;

a second pin of the control chip U1 is connected with the first power ground; a sixth pin of the control chip U1 is connected with the first power ground through the capacitor C6; a fifth pin of the control chip U1 is connected with the first power ground through the resistor R8; the capacitor C7 and the resistor R7 are connected in parallel, and are further connected between the two terminals of the resistor R8 in parallel; the third pin and the fourth pin of the control chip U1 are shortly connected, and are connected with the second power ground.

Preferably, the signal sample includes a filter rectifier circuit and a MOS transistor Q1;

an input terminal of the filter rectifier circuit is connected with the second input terminal, and an output terminal of the filter rectifier circuit is connected with a gate electrode of the MOS transistor Q1; a source electrode of the MOS transistor Q1 is connected with the first power ground, and a drain electrode of the MOS transistor Q1 is connected with the leakage current limit circuit.

Preferably, the filter rectifier circuit includes an inductor L2, a capacitor C9, a diode D9, a diode D10, a capacitor C10, a resistor R16, and a stabilivolt D11;

a first terminal of the inductor L2 is connected with the second input terminal, and a second terminal of the inductor L2 is connected with a first terminal of the capacitor; a second terminal of the capacitor C9 is connected with an anode of the diode D9 and a cathode of the diode D10; a cathode of the diode D9 is connected with the gate electrode of the MOS transistor Q1; the cathode of the diode D9 is further connected with the first power ground through the capacitor C10; the cathode of the diode D10 is connected with the first power ground; the resistor R9 is connected with two terminals of the capacitor C10 in parallel; a cathode of the stabilivolt D11 is connected the gate electrode of the MOS transistor Q1, and an anode of the stabilivolt D11 is connected with the first power ground.

Preferably, the signal sample circuit further includes an anti-reverse circuit connected between the leakage current limit circuit and the drain electrode of the MOS transistor Q1;

the anti-reverse circuit comprises a diode D12 and a diode D13;

an anode of the diode D12 is connected with the leakage current limit circuit, a cathode of the diode D12 is connected with the drain electrode of the MOS transistor Q1, the diode D13 is connected with the diode D12 in parallel.

The present disclosure further provides a LED lamp with the recited above LED driving circuit compatible with the electronic ballast and the electronic supply.

The LED driving circuit of the present disclosure has the following effects: the present disclosure is compatible with the electronic ballast and the electronic supply. When connecting with the electronic ballast, the high frequency voltage outputted by the electronic ballast is automatically depressed for protecting the subsequent circuit. When connecting with the electronic supply, it is satisfied with a single terminal and double terminals connecting the power. A leakage current test is passed by the double terminals connecting the power.

Besides, the fluorescent tube is directly replaced by the LED tube of the present disclosure when the electronic ballast of the fluorescent tube in the LED lamp of the disclosure still can be used, the labor cost is saved. When a life of the electronic ballast of the fluorescent tube is over, the electronic ballast of the fluorescent tube is removed, and the LED lamp is still used by simply refitted the circuits. Based on the leakage current protecting circuit, when a terminal of the LED lamp of the present disclosure connecting with a power, and a human body connects with another terminal of the LED lamp, there is no electronic shock danger for improving a safety function.

BRIEF DESCRIPTION OF THE FIGURES

The present disclosure will now be described combined with the figures and embodiments, in the figures.

DETAILED DESCRIPTION

In order to provide a more clarity understand of features, purposes, and effects of the present disclosure, a detail embodiment of the invention will be illustrated explained in contrast with the figures.

Figure 1:
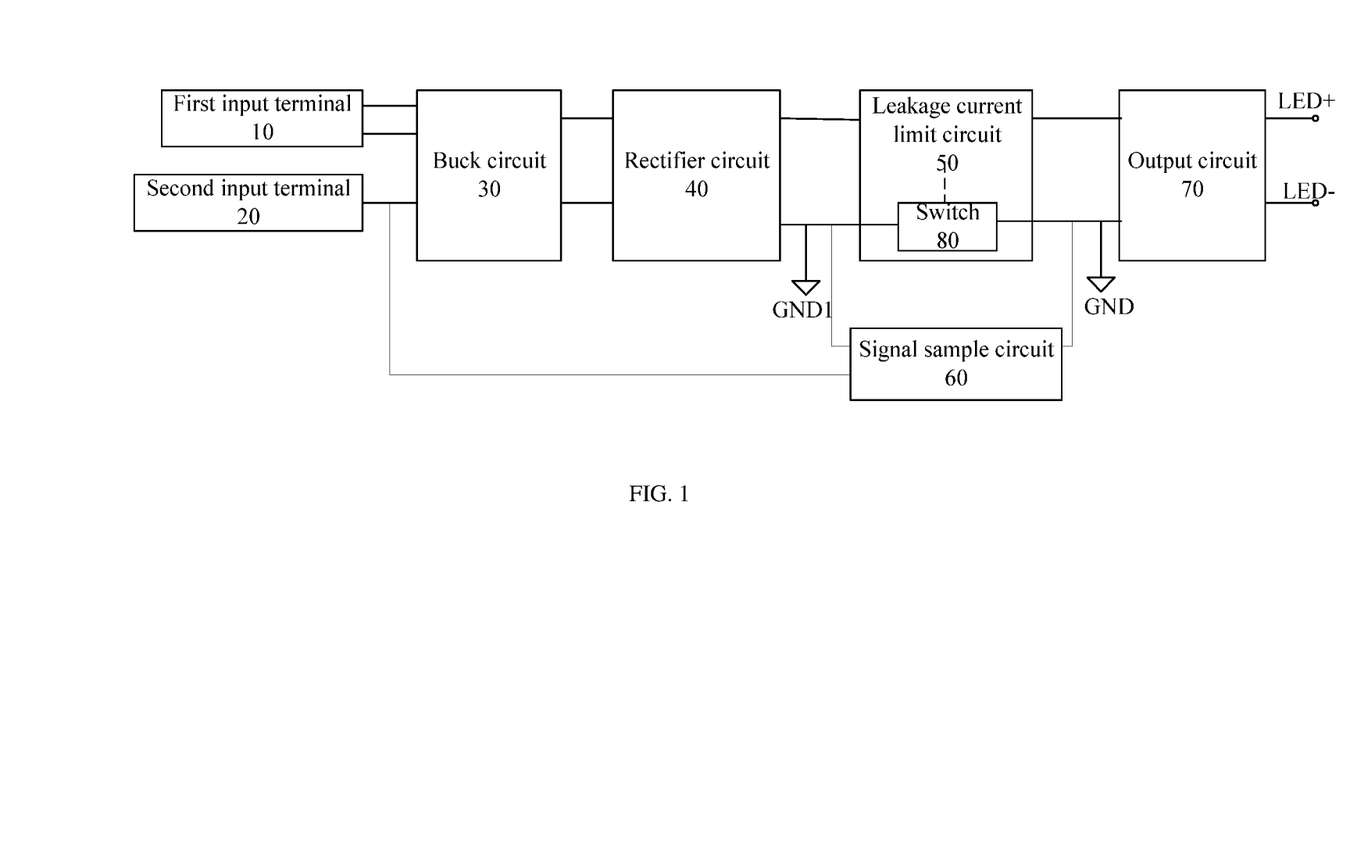
FIG. 1 is a schematic diagram view of an embodiment of a LED driving circuit compatible with an electronic ballast and an electronic supply.

Referring to FIG. 1, FIG. 1 shows a schematic diagram of an embodiment of a LED driving circuit compatible with an electronic ballast and an electronic supply. As shown in FIG. 1, the LED driving circuit of the embodiment compatible with the electronic ballast and the electronic supply includes a first input terminal 10 receiving an alternating current, a second input terminal 20, a buck circuit 30 connected with the first input terminal 10 and the second input terminal 20, a rectifier circuit 40 connected with the buck circuit 30, a leak current limit circuit 50 connected with the rectifier circuit 40, a constant current output circuit 70 connected with the leakage current limit circuit, a signal sample circuit 60 respectively connected with the second input terminal 20 and the leakage current limit circuit 50, and a switch 80 connected with the leak current limit circuit 50.

In detail, the alternating current inputted by the first input terminal 10 and the second input terminal 20 includes a high frequency alternating current and a low frequency alternating current outputted by the electronic ballast. When a connected external power source is the electronic supply, the inputted alternating current is the alternating current in 50/60 Hz; when the connected external power source is the electronic ballast (actually the electronic supply is inputted to the first input terminal 10 and the second input terminal 20 through the electronic ballast), the inputted alternating current is the high frequency alternating current. Generally, the high frequency alternating current is in a frequency range from 60 KHz to 80 KHz and in a voltage range from 600 V to 800 V.

In this embodiment, the buck circuit 30 mainly works when the inputted alternating current is the high frequency alternating current. When the inputted alternating current is the high frequency alternating current (the external power source is the electronic supply, and passes the electronic ballast), the buck circuit 30 depresses a voltage of the high frequency alternating current and outputs a buck signal. The buck circuit 30 between the first input terminal 10 and the second input terminal 20 effectively depresses the voltage of the high frequency alternating current outputted by the electronic ballast during the inputted alternating current is the high frequency alternating current, for avoiding the high frequency alternating current to affect subsequent circuits, and protecting the subsequent circuits. Based on the set buck circuit 30, when replacing the LED tube using the LED driving circuit with an original fluorescent tube, it is directly compatible with the electronic ballast. For example, when an electronic ballast of a fluorescent tube is still worked, a LED tube using a LED driving circuit of this embodiment directly replaces the original fluorescent tube, the labor cost is saved. Meantime, an efficiency energy saving is achieved by replacing the fluorescent tube with the LED tube. Besides, when the lift of the electronic ballast is over, only the electronic ballast of the fluorescent tube is replaced, and circuits are simply modified, thus the LED tube using the LED driving circuit is able to continue to use, and a cost of buying the tubes is saved.

Further, the buck circuit 30 of this embodiment does not work, and the low frequency alternating current is not affected, when the inputted alternating current is the low frequency alternating current, the inputted low frequency alternating current is directly flowed into the subsequent circuits.

Optionally, the buck circuit 30 of the embodiment is realized by a capacitor. The selected capacitor is a withstand voltage capacitor, for example, the capacitance of the capacitor is in a range from 1 nF to 4.7 nF.

In this embodiment, the rectifier circuit 40 converts the buck signal or the low frequency alternating current into a direct current. In detail, when the inputted alternating current is the low frequency alternating current (the external power source is the electronic supply, and the electronic ballast is not connected), the inputted alternating current is directly flowed into the rectifier circuit 40. The rectifier circuit 40 rectifies the low frequency current, and rectifies into a corresponding direct current for providing to the subsequent circuits. When the inputted current is the high frequency current (the electronic ballast outputs the high frequency current), the voltage of the high frequency current is firstly depressed by the buck circuit 30, and then is outputted to the rectifier circuit 40. The rectifier circuit 40 rectifies the buck signal outputted by the buck circuit 30, and rectifies into the direct current to provide to the subsequent circuits.

Optionally, the rectifier circuit 40 in this embodiment can be a bridge rectifier circuit.

In this embodiment, the leakage current limit circuit 50 is used for detecting a loop voltage of the LED driving circuit, and controls the switch 80 to be turned off for disconnecting the constant output circuit 70 and the rectifier circuit 40 when the loop voltage of the LED driving circuit reaches a threshold value. In detail, when as a type B model being normally connected with a power (the tube is connected with the electronic supply), the leakage current limit circuit 50 does not affect the switch 80 when the inputted alternating current is the low frequency current, the switch 80 remains being turned off, the rectifier circuit 40 outputs the direct current to the output circuit 70, the output circuit 70 normally outputs the current for powering a load (LED tube). When using as the type B model, and one of the first input terminal 10 and the second input terminal 20 is connected with a terminal L of the electronic supply, and another terminal is connected with the ground through a body impedance, the leakage current limit circuit 50 detects the loop voltage of the LED driving voltage by detecting internal circuits, the leakage current limit circuit 50 controls the switch 80 to be turned off when the loop voltage reaches the threshold value, a leakage current is cut off, an danger of an electronic shock is avoided. When one of the first input terminal 10 and the second input terminal 20 is connected with the terminal L of the electronic supply, and if a human connects with the other terminal, the leakage current limit circuit 50 detects that the human impedance connects with the ground, and determines that a leakage current is generated. The leakage current limit circuit 50 controls the switch 80 to be turned off for disconnecting a first power ground and a second power ground, the output circuit 70 stops to output the current, a loop of the leakage current is cut off, the leakage current is reduced, the electronic shock being supplied to the human body is avoided.

Optionally, the leakage current limit circuit 50 can include a current limit circuit and a control circuit.

An input terminal of the current limit circuit is connected with an output terminal of the rectifier circuit 40, an output terminal of the current limit circuit is connected with a power supply terminal of the control circuit. In detail, the current limit circuit mainly limits the current of the power supply voltage flowed into the control circuit, and the control circuit mainly detects the loop voltage of the LED driving circuit. The control circuit outputs a control signal for controlling the switch 80 to being turned off when the loop voltage reaches the threshold value, which causes the first power ground and the second power ground to be disconnected.

In this embodiment, the switch 80 can be turn on or turn off based on the control signal outputted by the control circuit. The switch 80 is a n-type MOS.

In this embodiment, the signal sample circuit 60 detects the alternating current of the second input terminal 20, and bypasses the leakage current limit circuit 50 when the alternating current of the second input terminal 20 is the high frequency alternating current. In detail, when the inputted alternating current is the low frequency alternating current, the signal sample circuit 60 does not work, and the leakage current limit circuit 50 normally works. When the inputted alternating current is the high frequency alternating current, the signal sample circuit 60 is being activated, and bypasses the leakage current limit circuit 50. It needs to be explained here, the leakage current limit circuit 50 used as a type A model (the inputted alternating current is the high frequency alternating current), because the leakage current limit circuit 50 is unable to detect the high frequency signal of the electronic ballast, and the leakage current limit circuit 50 can not execute a control function, which cause the first power ground and the second power ground to be unable normally turned-on, the output circuit 70 can not form the current loop through the leakage current limit circuit 50. By setting the signal sample circuit 60, when the inputted alternating current is the high frequency alternating current, the first power ground and the second power ground are turned-on, the output circuit 70 can form the current loop by the signal sample circuit 60, and normally outputs the current for powering the load. It is avoided that the output circuit 70 can not normally output the current for powering the load when the leakage current limit circuit 50 is does not work.

Further, the LED driving circuit compatible with the electronic ballast and the electronic supply further includes a first over-current protect circuit being connected between a first pin and the buck circuit 30 in series, a third over-current being connected between a second pin and the buck circuit 30 in series, and a second over-current protect circuit being connected between the second input terminal 20 and the buck circuit 30 in series.

The working principle of the LED driving circuit compatible with the electronic ballast and the electronic supply is illustrated with a specific embodiment as below.

Figure 2:
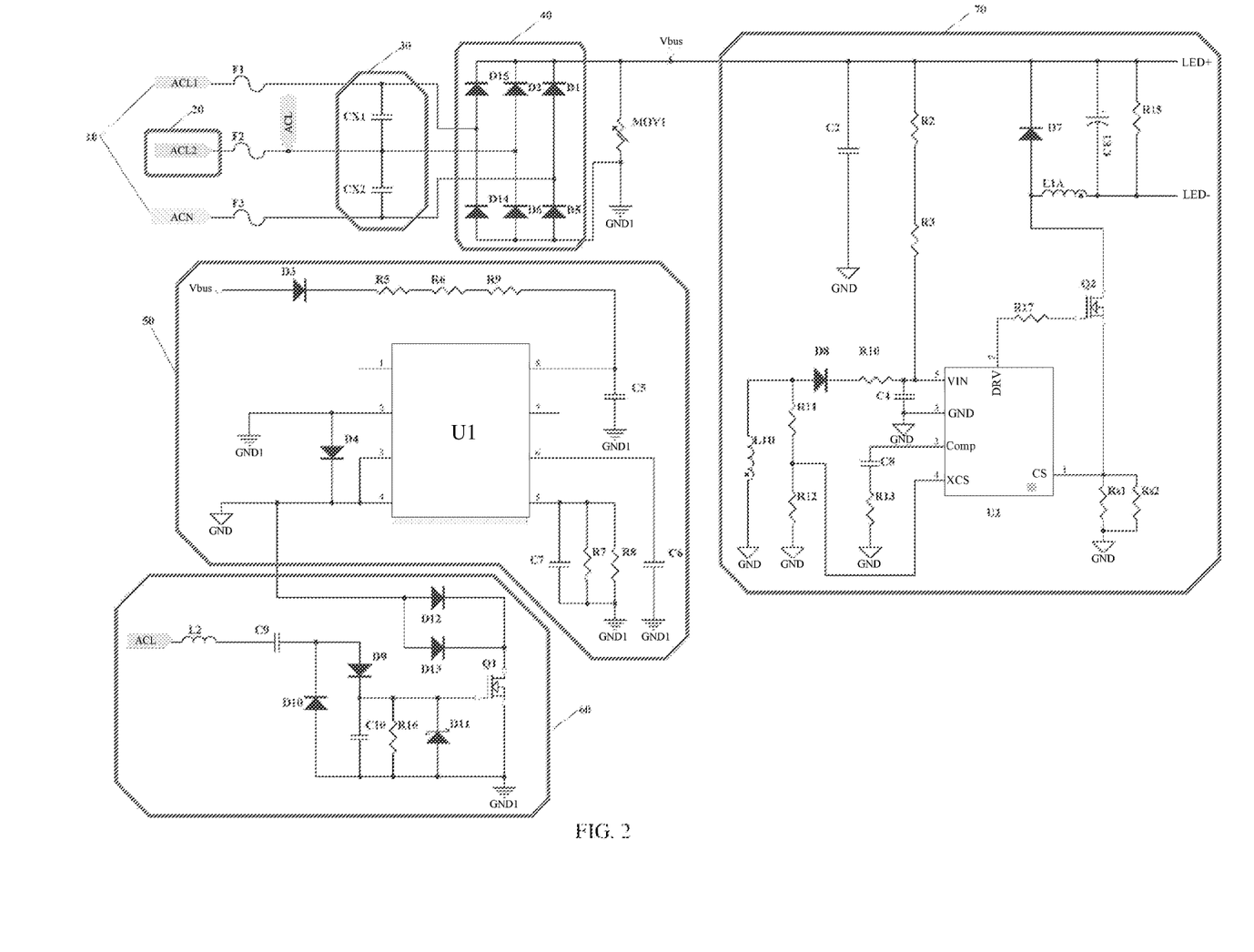
FIG. 2 is a circuit view of an embodiment of the LED driving circuit compatible with the electronic ballast and the electronic supply.

As shown in FIG. 2, the first input terminal 10 includes a first pin and a second pin. The second input terminal 20 includes a third pin and a fourth pin. The first pin is ACL1 in FIG. 2, the second pin is ACN in FIG. 2, and the third pin being short connected is served as the ACL2 in FIG. 2.

The first over-current protect circuit includes a first fuse F1. A first terminal of the first fuse F1 is connected with the first pin (ACL1), a second terminal of the first fuse F1 is connected with a first terminal of a first capacitor CX1 and the first input terminal 10 of the rectifier circuit 40. The second over-current protect circuit includes a second fuse F2. A first terminal of the second fuse F2 is connected with the second pin and a fourth pin (ACL2), and a second terminal of the second fuse F2 is connected with a second terminal of the first capacitor CX1 and a first terminal of a second capacitor CX2, and is further connected with the second input terminal 20 of the rectifier circuit 40. The third over-current protect circuit includes a third fuse F3. A first terminal of the third fuse F3 is connected with the second pin (ACN), and a second terminal of the third fuse F3 is connected with a second terminal of the second capacitor CX2, and further connected with a third input terminal of the rectifier circuit 40.

The buck circuit 30 includes the first capacitor CX1 and the second capacitor CX2. The first terminal of the first capacitor CX1 is connected with the first over-current protect circuit. The second terminal of the first capacitor CX1 and the first terminal of the second capacitor CX2 are connected with the second over-current protect circuit. The second terminal of the second capacitor CX2 is connected with the third over-current protect circuit. The detail connection relationship is the same as the above description.

The rectifier circuit 40 includes a diode D1, a diode D2, a diode D5, a diode D6, a diode D14, and a diode D15.

An anode of the diode D15 is connected with a cathode of the diode D14, a node connected with the anode of the diode D15 and the cathode of the diode D14 is a first input terminal of the rectifier circuit 40. An anode of the diode D2 is connected with a cathode of the diode D6, and a node connected with the anode of the diode D2 and the cathode of the diode D6 is a second input terminal of the rectifier circuit 40. An anode of the diode D1 is connected with a cathode of the diode D5, and a node connected between the anode of the diode D1 and the cathode of the diode D5 is the third input terminal of the rectifier circuit 40. Anodes of the diode D14, the diode D6, and the diode D5 are commonly connected with the first power ground (GND1). Cathodes of the diode D15, the diode D2, and the diode D1 as an output terminal of the rectifier circuit 40 are commonly connected with the leakage current limit circuit 50 and the output circuit 70.

The leakage current limit circuit 50 includes the limit circuit and the control circuit.

Figure 3:
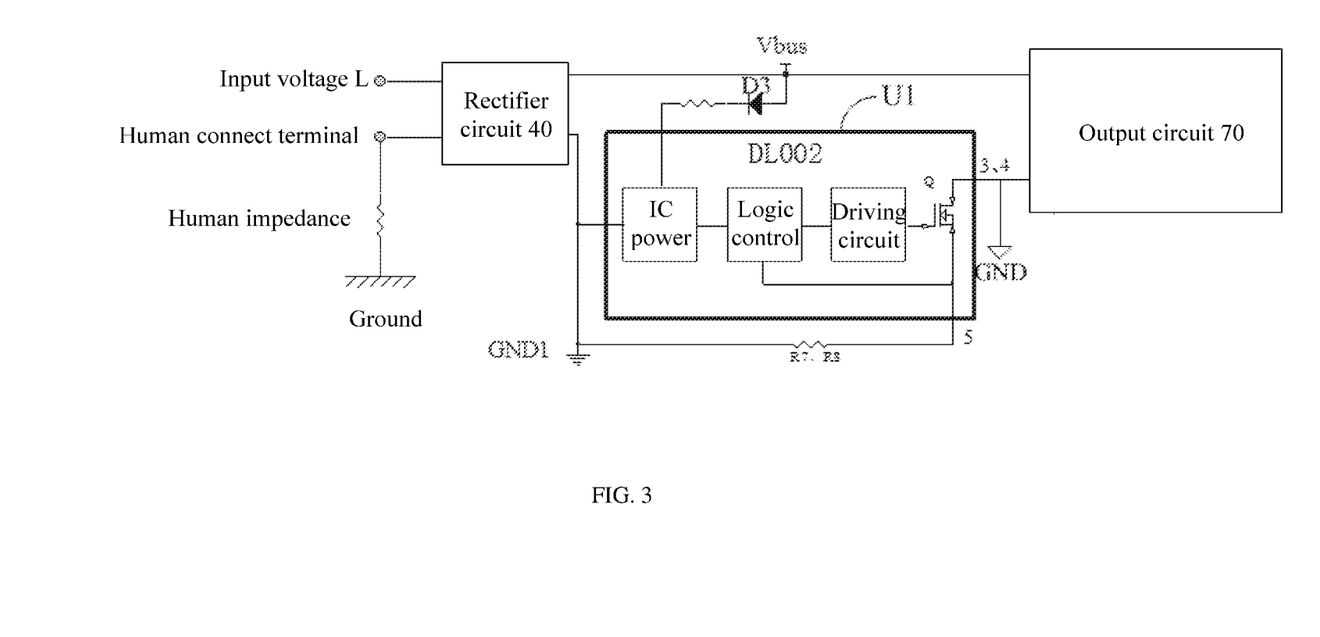
FIG. 3 is a schematic diagram view of the switch embedded in the control chip U1.

In detail, as shown in FIG. 2, the limit circuit includes a diode D3, a resistor R5, a resistor R6, and a resistor R9. The control circuit includes a control chip U1, a capacitor C5, a capacitor C7, a resistor R7, a resistor R8, and a capacitor C6. Further, in this embodiment, the switch 80 is embedded in the control chip U1 as an example. An equivalent circuit inside the control chip U1 is shown in FIG. 3.

The switch 80 includes a MOS transistor Q. The MOS transistor Q is embedded in the control chip U1.

The control chip U1 includes a power supply circuit, a logic control circuit, and a driving circuit. An input terminal of the power supply circuit is connected with an eighth pin of the control chip U1, and an output terminal of the power supply circuit is connected with the logic control circuit. The logic control circuit is connected with an input terminal of the driving circuit, and an output terminal of the driving circuit is connected with a gate electrode of the MOS transistor Q. A drain electrode of the MOS transistor Q is connected with the third pin and the fourth pin of the control chip U1. A source electrode of the MOS transistor Q and the logic control circuit are connected with a fifth pin of the control chip U1.

An anode of the diode D3 is connected with the output terminal of the rectifier circuit 40, a cathode of the diode D3 is connected with a first terminal of the resistor R5, a second terminal of the resistor R5 is connected with a first terminal of the resistor R6, a second terminal of the resistor R6 is connected with a first terminal of the resistor R9, and a second terminal of the resistor R9 is connected with the power supply terminal (the eighth pin of the control chip U1) of the control circuit. In other embodiments, the diode D3 can be omitted.

The eighth pin of the control chip U1 as the power supply terminal is connected with the second terminal of the resistor R9. The eighth pin of the control chip U1 is further connected with the first power ground (GND1) through the capacitor C5. The second pin of the control chip U1 is connected with the first power ground (GND1). A sixth pin of the control chip U1 is connected with the first power ground (GND1) through the capacitor C6. The fifth pin of the control chip U1 is connected with the first power ground (GND1) through the resistor R8. The capacitor C7 and the resistor R7 are connected in parallel, and are further connected between the two terminals of the resistor R8 in parallel. The third pin and the fourth pin of the control chip U1 are shortly connected, and are connected with the second power ground (GND). Certainly, in other embodiments, the switch 80 of the embodiment can be set outside the control chip U1. In this embodiment, the switch 80 is embedded in the control chip U1. When the switch 80 is embedded in the control chip U1, the control chip U1 is a DL002 model control chip. When the switch 80 is set outside the control chip U1, the control chip U1 is a DIO8275 model control chip. The switch 80 is a n-type MOS transistor.

It needs to be explained here, the first power ground (GND1) and the second power ground (GND2) are a power ground. The first power ground (GND1) is the power ground between the rectifier circuit 40 and the leakage current limit circuit 50. The second power ground (GND2) is the power ground between the leakage current limit circuit 50 and the output circuit 70.

The signal sample circuit 60 includes a filter rectifier circuit and a MOS transistor Q1.

An input terminal of the filter rectifier circuit is connected with the second input terminal 20, and an output terminal of the filter rectifier circuit is connected with a gate electrode of the MOS transistor Q1. A source electrode of the MOS transistor Q1 is connected with the first power ground, and a drain electrode of the MOS transistor Q1 is connected with the leakage current limit circuit 50.

In detail, the filter rectifier circuit includes an inductor L2, a capacitor C9, a diode D9, a diode D10, a capacitor C10, a resistor R16, and a stabilivolt D11.

A first terminal of the inductor L2 is connected with the second input terminal 20 (ACL2), and a second terminal of the inductor L2 is connected with a first terminal of the capacitor C9. A second terminal of the capacitor C9 is connected with an anode of the diode D9 and a cathode of the diode D10. A cathode of the diode D9 is connected with the gate electrode of the MOS transistor Q1. A cathode of the diode D9 is connected with the first power ground (GND1) through the capacitor C10. An anode of the diode D10 is connected with the first power ground (GND1). The resistor R9 is connected with two terminals of the capacitor C10 in parallel. A cathode of the stabilivolt D11 is connected the gate electrode of the MOS transistor Q1, and an anode of the stabilivolt D11 is connected with the first power ground GND1.

Further, the signal sample circuit 60 further includes an anti-reverse circuit connected between the leakage current limit circuit 50 and the drain of the MOS transistor Q1. The anti-reverse circuit includes a diode D12 and a diode D13.

An anode of the diode D12 is connected with the leakage current limit circuit 50 (as shown in FIG. 2, the anode of the diode D12 is connected with the fourth pin of the control chip U1 and the second power ground (GND)), a cathode of the diode D12 is connected with the drain electrode of the MOS transistor Q1. The diode D13 is connected with the diode D12 in parallel. It can be understand that the anti-reverse circuit is composed by the diode D12 and the diode D13. In other embodiments, the anti-reverse circuit is composed by one of the diode D12 and the diode D13. Otherwise, in other embodiments, the anti-reverse circuit is composed by more than two diodes.

In this embodiment, the inductor L2 can serve as a filter function. The capacitor C9 can serve as a detection function of the signal inputted by the second input terminal 20 (ACL2). The diode D9 can serve as a rectifier function. The capacitor C10 can serve as a charging and maintaining function of a voltage. The resistor R16 can serve as a discharging function. The stabilivolt D11 can serve as a clamping function for preventing the MOS transistor Q1 from being damaged.

As shown in FIG. 2, the output circuit 70 includes a capacitor C2, a resistor R2, a resistor R3, a diode D7, a transformer L1, a capacitor CE1, a resistor R15, a resistor R11, a resistor R12, a diode D8, a resistor R10, a capacitor C4, a capacitor C8, a resistor R13, a resistor R17, a MOS transistor Q2, a resistor Rs1, a resistor Rs2, and a chip U2. The transformer L1 includes a main winding L1A and an auxiliary power supply winding L1B.

A first terminal of the capacitor C2 is connected with the output terminal of the rectifier circuit 40, a second terminal of the capacitor C2 is connected with the second power ground (GND). A first terminal of the resistor R2 is connected with the first terminal of the capacitor C2, and a second terminal of the resistor R2 is connected with the pin PIN5 of the chip U2. A cathode of the diode D7 is connected with a first terminal of the resistor R2, and an anode of the diode D7 is connected with the negative terminal (LED-) of the output terminal 70 through the main winding L1A. The anode of the diode D7 is further connected with a drain electrode of the MOS transistor Q2. The capacitor CE1 is connected between a positive terminal (LED+) and the negative terminal (LED-) of the output circuit 70. The resistor R15 is connected with the two terminals of the capacitor CE1 in parallel.

A pin PIN5 of the chip U2 is connected with a cathode of the diode D8 through the resistor R10, and an anode of the diode D8 is connected with the second power ground (GND) through the auxiliary power supply winding L1B. The anode of the diode D8 is further connected with the second power ground (GND) through the resistor R11 and the resistor R12. A node connected between the resistor R11 and the resistor R12 is further connected with a pin PIN4 of the chip U2. A pin PIN2 of the chip U2 is grounded. The capacitor C4 is connected between the pin PIN5 and a pin PIN2 of the chip U2. A pin PIN3 of the chip U2 is connected with the second power ground (GND) through the capacitor C8 and the resistor R13. The pin PIN2 of the chip U2 is connected with a gate electrode of the MOS transistor Q2 through the resistor R17. A pin PIN1 of the chip U2 is connected with a source electrode of the MOS transistor Q2. The pin PIN1 of the chip U2 is further connected with the second power ground (GND) through the resistor Rs1 and the resistor Rs2.

The LED driving circuit compatible the electronic ballast and the electronic supply is compatible with the electronic supply with one single terminal connecting the power (type B model) or double terminals connecting the power, and compatible with the electronic ballast (type A model), also can be used as the type A model or the type B model alone. Different states are explained as below.

A first state: using as the type B model (electronic supply) with the double terminals normally connected with the power:

The capacitor C9 of the signal sample circuit 60 detects the signal of the ACL2 is the 50/60 Hz of the low frequency alternating current. At this time, based on the function of the capacitor C9, no current passes through the diode D9, the voltage of the gate electrode of the MOS transistor Q1 does not reach a turn-on voltage thereof, at this time, the MOS transistor Q1 is in a turn-off state, and the signal sample circuit does not work. The control chip U1 of the leakage current limit circuit 50 detects the voltage of the fifth pin of the control chip U1. When the voltage of the fifth pin of the control chip U1 does not reach the threshold value, the embedded switch 80 remains in the turn-on state, the first power ground (GND1) and the second power ground (GND) are connected, the output circuit 70 normally outputs the constant current for powering the load (LED tube). It can be understood that the voltage of the fifth pin of the control chip U1 is a sample voltage of the loop voltage of the LED driving circuit. The sample voltage can reflect the states of the loop voltage. The loop voltage of the LED driving circuit is detected by detecting the sample voltage (the voltage of the fifth pin of the control chip U1).

A second state: using as the type B model with the one single terminal normally connected with the power:

There is no voltage at the second input terminal 20 (ACL2), the signal sample circuit 60 detects that there is no input signal at the terminal ACL2, at this time, the MOS transistor Q1 is in the turn-off state. The signal sample circuit does not work. The control chip U1 of the leakage current limit circuit 50 detects the voltage of the fifth pin of the control chip U1. When the voltage of the fifth pin does not reach the threshold value, the embedded switch 80 remains in the turned-on state, the first power ground (GND1) and the second power ground (GND) are connected, the output circuit 70 normally outputs the constant current for powering the load (LED tube).

A third state: using as the type B model with a human body connected with the power:

When a terminal of the tube (if the first input terminal 10 is connected with the terminal L (live line)), and the human body is connected with the other terminal (ACL2), at this time, the control chip U1 of the leakage current limit circuit 50 determines that there is a leakage current, and controls the embedded switch 80 to be turned off. At this time, the first power ground (GND1) and the second power ground (GND) are disconnected, the loop of the leakage current is cut off, the leakage current is reduced, and the human body is prevented from being electronic shock. In detail, as shown in FIG. 3, the logic circuit of the control chip U1 detects the voltage of the pin PIN5 in real time, and a loop resistance of the LED driving circuit is determined by the voltage of the pin PIN5. In general, a resistance of the human body is in a range from 1 KΩ to 2 KΩ, when the loop resistance is greater than 500Ω, and a transient peak of the leakage current is greater than 5 mA, the voltage generated on the resistor R7 and resistor R8 by the leakage current reaches a IC leakage current protect trigger voltage (the threshold value), the logic control circuit provides a low voltage control signal to the driving circuit, and the MOS transistor Q is turned off. The leakage current loop is cut off, the leakage current is reduced. After being turned off for a time duration, the logic control circuit turns on the MOS transistor Q again for detecting again. Once the transient peak of the leakage current is 5 mA, the MOS transistor Q is turned off, the leakage current is reduced. Due to the periodic detection, a virtual value of the leakage current is maintained within 5 mA. When the leaking current is lower than 5 mA while the MOS transistor Q is turned on, the MOS transistor Q will be turned on all the time, which keeps the output circuit 70 normally working.

Fourth state: using as the type A model (connected with the electronic ballast) connected with the power:

The first capacitor CX1 of the buck circuit 30 and/or the second capacitor CX2 depresses the high frequency alternating voltage of the electronic ballast, and outputs the alternating voltage in a specified range (such as lower than 300V, an alternating voltage in a range from 60 KHz to 80 KHz), thus a function of protecting the subsequent circuit is achieved, the subsequent circuits will not being breakdown caused by the excessive voltage. The output circuit 70 can normally output the constant current for powering the load (LED tube).

In detail, the leakage current limit circuit 50 under this state is unable to detect the high frequency signal of the electronic ballast. The leakage current limit circuit 50 does not serve a control function, and the first power ground (GND1) and the second power ground (GND) are unable to be connected normally. The output circuit 70 can not form the current loop through the leakage current limit circuit 50. The signal sample circuit 60 can detect that the signal of the terminal ACL2 is the high frequency (in a range between 60 KHz to 80 KHz) of the frequency signal. A current flows into the gate electrode of the MOS transistor Q1, and the MOS transistor Q1 turns on. The first power ground (GND1) and the second power ground (GND) are connected, and the output circuit 70 forms the current loop through the signal sample circuit 60, the failure of the output circuit 70 is avoided without the current loop when the leakage current limit circuit 50 does not work.

A LED lamp is also provided in this embodiment. The LED lamp includes the above LED driving circuit compatible with the electronic ballast and the electronic supply.

The present disclosure is compatible with the electronic ballast and the electronic supply. When connecting with the electronic ballast, the high frequency voltage outputted by the electronic ballast is automatically depressed for protecting the subsequent circuits. When connecting with the electronic supply, it is satisfied with a single terminal and double terminals connecting the power. A leakage current test is passed by the double terminals connecting the power.

Besides, the fluorescent tube is directly replaced by the LED tube of the present disclosure when the electronic ballast of the fluorescent tube in the LED lamp of the disclosure still can be used, the labor cost is saved. When a life of the electronic ballast of the fluorescent tube is over, the electronic ballast of the fluorescent tube is removed, and the LED lamp is still used by simply refitted the circuits. Based on the leakage current protecting circuit, when a terminal of the LED lamp of the present disclosure connecting with a power, and the human body connects with another terminal of the LED lamp, there is no electronic shock danger for improving a safety function.

The foregoing implementations are merely illustrated the technical concept and the features of the disclosure, it is understood that persons skilled in the art is able to implement accordingly, but not limited the protection scope of the present disclosure. It should noted that any variation or modifies disclosed in the present disclosure shall all fall into the protection scope of the present disclosure.

It can be understood that, any improvement or modifies disclosed in the present disclosure can be made by persons skilled in the art, which shall all fall into the protection scope of the claims of the present disclosure.

What is claimed is:

1. A LED driving circuit compatible with an electronic ballast and an electronic supply, the LED driving circuit comprising:
   a first input terminal receiving an alternating current, a second input terminal, a buck circuit connected with the first input terminal and the second input terminal, a rectifier circuit connected with the buck circuit, a leak current limit circuit connected with the rectifier circuit, a constant current output circuit, a signal sample circuit, and a switch connected with the leak current limit circuit;
   when the alternating current is a high frequency alternating current outputted by the electronic ballast, the buck circuit depresses the high frequency alternating current and outputs a buck signal; the rectifier circuit converts the buck signal or a low frequency alternating current into a direct current; the signal sample circuit detects the alternating current of the second input terminal, and bypasses the leakage current limit circuit when the alternating current of the second input terminal is the high frequency alternating current;
   when the alternating current is a low frequency alternating current, the leakage current limit circuit detects a loop voltage of the LED driving circuit, and controls the switch to be turned off when the loop voltage of the LED driving circuit reaches a threshold value, and the constant current output circuit disconnects with the rectifier circuit.

2. The LED driving circuit compatible with the electronic ballast and the electronic supply of claim 1, wherein the first terminal comprises a first pin and a second pin;
   the LED driving circuit compatible with the electronic ballast and the electronic supply comprises a first over-current protect circuit being connected between the first pin and the buck circuit in series, a third over-current protect circuit being connected between the second pin and the buck circuit in series, and a second over-current protect circuit being connected between the second input terminal and the buck circuit in series.

3. The LED driving circuit compatible with the electronic ballast and the electronic supply of claim 2, wherein the buck circuit comprises a first capacitor and a second capacitor;
   a first terminal of the first capacitor is connected with the first over-current protect circuit; a second terminal of the first capacitor and a first terminal of the second capacitor are connected with the second over-current protect circuit; and a second terminal of the second capacitor is connected with the third over-current protect circuit.

4. The LED driving circuit compatible with the electronic ballast and the electronic supply of claim 3, wherein the leakage current limit circuit comprises a limit circuit and a control circuit;
  an input terminal of the limit circuit is connected with an output terminal of the rectifier circuit; an output terminal of the limit circuit is connected with a power supply terminal of the control circuit.

5. The LED driving circuit compatible with the electronic ballast and the electronic supply of claim 4, wherein the limit circuit comprises a first diode (D3), a first resistor (R5), a second resistor (R6), and a third resistor (R9);
  an anode of the first diode (D3) is connected with the output terminal of the rectifier circuit, a cathode of the first diode (D3) is connected with a first terminal of the first resistor (R5), a second terminal of the first resistor (R5) is connected with a first terminal of the second resistor (R6), a second terminal of the second resistor (R6) is connected with a first terminal of the third resistor (R9), and a second terminal of the third resistor (R9) is connected with the power supply terminal of the control circuit.

6. The LED driving circuit compatible with the electronic ballast and the electronic supply of claim 5, wherein the control circuit comprises a control chip (U1), a third capacitor (C5), a fourth capacitor (C7), a fourth resistor (R7), a fifth resistor (R8), and a fifth capacitor (C6);
  the switch comprises a MOS transistor (Q); the MOS transistor (Q) is embedded in the control chip (U1);
  the control chip (U1) comprises a power supply circuit, a logic control circuit, and a driving circuit; an input terminal of the power supply circuit is connected with a eighth pin of the control chip (U1), and an output terminal of the power supply circuit is connected with the logic control circuit; the logic control circuit is connected with an input terminal of the driving circuit, and an output terminal of the driving circuit is connected with a gate electrode of the MOS transistor (Q); a drain electrode of the MOS transistor (Q) is connected with a third pin and a fourth pin of the control chip (U1); a source electrode of the MOS transistor (Q) and the logic control circuit are connected with a fifth pin of the control chip (U1);
  the eighth pin of the control chip (U1) as the power supply terminal of the control circuit is connected with the second terminal of the third resistor (R9); the eighth pin of the control chip (U1) is further connected with the first power ground through the third capacitor (C5);
  a second pin of the control chip (U1) is connected with the first power ground; a sixth pin of the control chip (U1) is connected with the first power ground through the fifth capacitor (C6); a fifth pin of the control chip (U1) is connected with the first power ground through the fifth resistor (R8); the fourth capacitor (C7) and the fourth resistor (R7) are connected in parallel, and are further connected between the two terminals of the fifth resistor (R8) in parallel; the third pin and the fourth pin of the control chip (U1) are shortly connected, and are connected with the second power ground.

7. The LED driving circuit compatible with the electronic ballast and the electronic supply of claim 1, wherein the signal sample comprises a filter rectifier circuit and a second MOS transistor (Q1);
  an input terminal of the filter rectifier circuit is connected with the second input terminal, and an output terminal of the filter rectifier circuit is connected with a gate electrode of the second MOS transistor (Q1); a source electrode of the second MOS transistor (Q1) is connected with the first power ground, and a drain electrode of the second MOS transistor (Q1) is connected with the leakage current limit circuit.

8. The LED driving circuit compatible with the electronic ballast and the electronic supply of claim 7, wherein the filter rectifier circuit comprises an inductor (L2), a sixth capacitor (C9), a second diode (D9), a third diode (D10), a seventh capacitor (C10), a sixth resistor (R16), and a stabilivolt (D11);
  a first terminal of the inductor (L2) is connected with the second input terminal, and a second terminal of the inductor (L2) is connected with a first terminal of the sixth capacitor (C9); a second terminal of the sixth capacitor (C9) is connected with an anode of the second diode (D9) and a cathode of the third diode (D10); a cathode of the second diode (D9) is connected with the gate electrode of the second MOS transistor (Q1); the cathode of the second diode (D9) is further connected with the first power ground through the seventh capacitor (C10); the cathode of the third diode (D10) is connected with the first power ground; the sixth resistor (R16) is connected with two terminals of the seventh capacitor (C10) in parallel; a cathode of the stabilivolt (D11) is connected the gate electrode of the second MOS transistor (Q1), and an anode of the stabilivolt (D11) is connected with the first power ground.

9. The LED driving circuit compatible with the electronic ballast and the electronic supply of claim 7, wherein the signal sample circuit further comprises an anti-reverse circuit connected between the leakage current limit circuit and the drain electrode of the second MOS transistor (Q1);
  the anti-reverse circuit comprises a fourth diode (D12) and a fifth diode (D13);
  an anode of the fourth diode (D12) is connected with the leakage current limit circuit, a cathode of the fourth diode (D12) is connected with the drain electrode of the second MOS transistor (Q1), the fifth diode (D13) is connected with the fourth diode (D12) in parallel.

10. A LED lamp comprising:
  a LED driving circuit compatible with an electronic ballast and an electronic supply; the LED driving circuit comprising:
  a first input terminal receiving an alternating current, a second input terminal, a buck circuit connected with the first input terminal and the second input terminal, a rectifier circuit connected with the buck circuit, a leak current limit circuit connected with the rectifier circuit, a constant current output circuit, a signal sampling circuit, and a switch connected with the leak current limit circuit;
  when the alternating current is a high frequency alternating current outputted by the electronic ballast, the buck circuit depresses the high frequency alternating current and outputs a buck signal; the rectifier circuit converts the buck signal or a low frequency alternating current into a direct current; the signal sample circuit detects the alternating current of the second input terminal, and bypasses the leakage current limit circuit when the alternating current of the second input terminal is the high frequency alternating current;
  when the alternating current is a low frequency alternating current, the leakage current limit circuit detects a loop voltage of the LED driving circuit, and controls the switch to be turned off when the loop voltage of the LED driving circuit reaches a threshold value, and the constant current output circuit disconnects with the rectifier circuit.

11. The LED lamp of claim 10, wherein the first terminal comprises a first pin and a second pin;

the LED driving circuit compatible with the electronic ballast and the electronic supply comprises a first over-current protect circuit being connected between the first pin and the buck circuit in series, a third over-current protect current being connected between the second pin and the buck circuit in series, and a second over-current protect circuit being connected between the second input terminal and the buck circuit in series.

12. The LED lamp of claim 11, wherein the buck circuit comprises a first capacitor and a second capacitor;

a first terminal of the first capacitor is connected with the first over-current protect circuit; a second terminal of the first capacitor and a first terminal of the second capacitor are connected with the second over-current protect circuit; and a second terminal of the second capacitor is connected with the third over-current protect circuit.

13. The LED lamp of claim 12, wherein the leakage current limit circuit comprises a limit circuit and a control circuit;

an input terminal of the limit circuit is connected with an output terminal of the rectifier circuit; an output terminal of the limit circuit is connected with a power supply terminal of the control circuit.

14. The LED lamp of claim 13, wherein the limit circuit comprises a first diode (D3), a first resistor (R5), a second resistor (R6), and a third resistor (R9);

an anode of the first diode (D3) is connected with the output terminal of the rectifier circuit, a cathode of the first diode (D3) is connected with a first terminal of the first resistor (R5), a second terminal of the first resistor (R5) is connected with a first terminal of the second resistor (R6), a second terminal of the second resistor (R6) is connected with a first terminal of the third resistor (R9), and a second terminal of the third resistor (R9) is connected with the power supply terminal of the control circuit.

15. The LED lamp of claim 14, wherein the control circuit comprises a control chip (U1), a third capacitor (C5), a fourth capacitor (C7), a fourth resistor (R7), a fifth resistor (R8), and a fifth capacitor (C6);

the switch comprises a MOS transistor (Q); the MOS transistor (Q) is embedded in the control chip (U1);

the control chip (U1) comprises a power supply circuit, a logic control circuit, and a driving circuit; an input terminal of the power supply circuit is connected with a eighth pin of the control chip (U1), and an output terminal of the power supply circuit is connected with the logic control circuit; the logic control circuit is connected with an input terminal of the driving circuit, and an output terminal of the driving circuit is connected with a gate electrode of the MOS transistor (Q); a drain electrode of the MOS transistor (Q) is connected with a third pin and a fourth pin of the control chip (U1); a source electrode of the MOS transistor (Q) and the logic control circuit are connected with a fifth pin of the control chip (U1);

the eighth pin of the control chip (U1) as the power supply terminal of the control circuit is connected with the second terminal of the third resistor (R9); the eighth pin of the control chip (U1) is further connected with the first power ground through the third capacitor (C5);

a second pin of the control chip (U1) is connected with the first power ground; a sixth pin of the control chip (U1) is connected with the first power ground through the fifth capacitor (C6); a fifth pin of the control chip (U1) is connected with the first power ground through the fifth resistor (R8); the fourth capacitor (C7) and the fourth resistor (R7) are connected in parallel, and are further connected between the two terminals of the fifth resistor (R8) in parallel; the third pin and the fourth pin of the control chip (U1) are shortly connected, and are connected with the second power ground.

16. The LED lamp of claim 10, wherein the signal sample comprises a filter rectifier circuit and a second MOS transistor (Q1);

an input terminal of the filter rectifier circuit is connected with the second input terminal, and an output terminal of the filter rectifier circuit is connected with a gate electrode of the second MOS transistor (Q1); a source electrode of the second MOS transistor (Q1) is connected with the first power ground, and a drain electrode of the second MOS transistor (Q1) is connected with the leakage current limit circuit.

17. The LED lamp of claim 16, wherein the filter rectifier circuit comprises an inductor (L2), a sixth capacitor (C9), a second diode (D9), a third diode (D10), a seventh capacitor (C10), a sixth resistor (R16), and a stabilivolt (D11);

a first terminal of the inductor (L2) is connected with the second input terminal, and a second terminal of the inductor (L2) is connected with a first terminal of the sixth capacitor (C9); a second terminal of the sixth capacitor (C9) is connected with an anode of the second diode (D9) and a cathode of the third diode (D10); a cathode of the second diode (D9) is connected with the gate electrode of the second MOS transistor (Q1); the cathode of the second diode (D9) is further connected with the first power ground through the seventh capacitor (C10); the cathode of the third diode (D10) is connected with the first power ground; the sixth resistor (R16) is connected with two terminals of the seventh capacitor (C10) in parallel; a cathode of the stabilivolt (D11) is connected the gate electrode of the second MOS transistor (Q1), and an anode of the stabilivolt (D11) is connected with the first power ground.

18. The LED lamp of claim 16, wherein the signal sample circuit further comprises an anti-reverse circuit connected between the leakage current limit circuit and the drain electrode of the second MOS transistor (Q1);

the anti-reverse circuit comprises a fourth diode (D12) and a fifth diode (D13);

an anode of the fourth diode (D12) is connected with the leakage current limit circuit, a cathode of the fourth diode (D12) is connected with the drain electrode of the second MOS transistor (Q1), the fifth diode (D13) is connected with the fourth diode (D12) in parallel.

\* \* \* \* \*